United States Patent [19]
Yamauchi et al.

[11] Patent Number: 5,243,582
[45] Date of Patent: Sep. 7, 1993

[54] APPARATUS FOR REPRODUCING DIGITAL AUDIO INFORMATION RELATED TO MUSICAL ACCOMPANIMENTS

[75] Inventors: Keiichi Yamauchi; Toshihiko Shimizu; Satomi Sudo, all of Kawagoe, Japan

[73] Assignee: Pioneer Electronic Corporation, Tokyo, Japan

[21] Appl. No.: 724,630

[22] Filed: Jul. 2, 1991

[30] Foreign Application Priority Data

Jul. 6, 1990 [JP] Japan ................................ 2-179793

[51] Int. Cl.⁵ ............................................ G11B 27/19
[52] U.S. Cl. .................................... 369/32; 369/48; 358/342
[58] Field of Search .................... 369/32, 33, 48, 49, 369/59; 358/335, 342, 341, 343; 364/419

[56] References Cited
U.S. PATENT DOCUMENTS

| 4,899,326 | 2/1990 | Takeya et al. | 369/33 |
| 5,046,004 | 9/1991 | Tsumura et al. | 364/419 |
| 5,099,337 | 3/1992 | Cury | 358/335 |
| 5,117,407 | 5/1992 | Vogel | 369/32 |
| 5,130,966 | 7/1992 | Yoshio | 358/335 |
| 5,131,311 | 7/1992 | Murakami et al. | 358/342 |

Primary Examiner—Donald E. McElheny, Jr.
Attorney, Agent, or Firm—Sughrue, Mion, Zinn, Macpeak & Seas

[57] ABSTRACT

A CD-ROMXA disk stores digital audio information including a plurality of music piece information, a digital contents information table including word-of-song information which represents the words of the music piece information and word-of-song address information for specifying the time-base position of the word-of-song information, and music address information for specifying the time-base position of the music information, the music address information corresponding to the word-of-song address information. The CD-ROMXA disk is typically loaded in a musical accompaniment playback apparatus, or "karaoke" playback apparatus. When the disk is played back, the recorded digital audio information is reproduced to play back a desired musical accompaniment. A word-of-song start address position in the word-of-song address information is specified for thereby starting reproducing the music piece information from a music start address position which corresponds to the word-of-song start address position. A word-of-song end address position in the word-of-song address information is specified for thereby stopping reproducing the music piece information at a music end address position in the word-of-song address information which corresponds to the word-of-song end address position.

7 Claims, 11 Drawing Sheets

FIG. 4

| SOUND QUALITY LEVEL | | TYPE | SAMPLING FREQUENCY (kHz) | QUANTIZING NUMBER (BIT) | BIT REDUCTION RATIO (STEREO/MONO) | AUDIO CHARACTERISTICS | |
|---|---|---|---|---|---|---|---|
| | | | | | | DYNAMIC RANGE (dB) | FREQUENCY RANGE (kHz) |
| | CD DIGITAL AUDIO (SOUND QUALITY CORRESPONDING TO PRESENT 16-BIT PCM) | PCM | 44.1 | 16 | 1 | 98 | 20 |
| A | HIFI (SOUND QUALITY CORRESPONDING TO LP RECORD) | ADPCM | 37.8 | 8 | 1/2 / 1/4 | 90 | 17 |
| B | MID-HIFI (SOUND QUALITY CORRESPONDING TO FM BROADCAST) | ADPCM | 37.8 | 4 | 1/4 / 1/8 | 90 | 17 |
| C | SPEECH (SOUND QUALITY CORRESPONDING TO AM BROADCAST) | ADPCM | 18.9 | 4 | 1/8 / 1/16 | 50 | 8.5 |

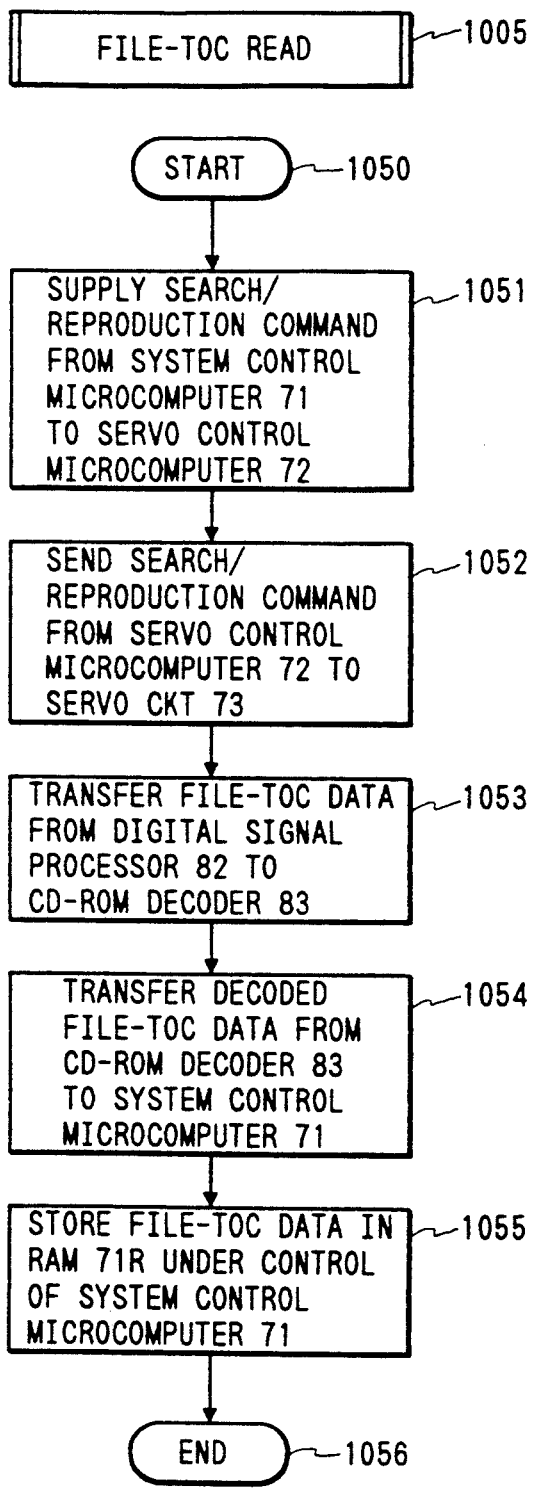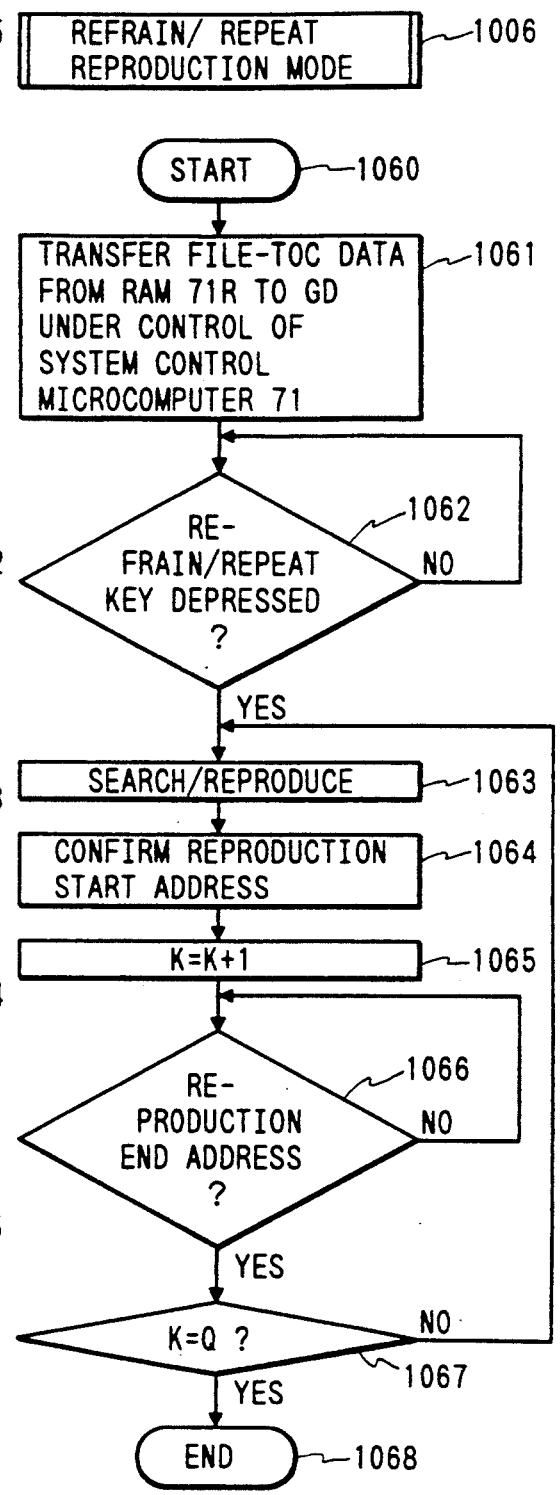

APPARATUS FOR REPRODUCING DIGITAL AUDIO INFORMATION RELATED TO MUSICAL ACCOMPANIMENTS

BACKGROUND OF THE INVENTION

The present invention relates to an apparatus for reproducing information, and more particularly to an apparatus for reproducing digital audio information, especially for playing back pre-recorded musical accompaniments, so-called "karaoke".

A conventional apparatus for playing back pre-recorded musical accompaniments, or a musical accompaniment playback apparatus, reproduces such pre-recorded musical accompaniments by playing back information recording mediums, such as magnetic tapes video disks, etc., on which only musical accompaniments are recorded. Such a musical accompaniment playback apparatus includes an amplifier connected to a microphone and a loudspeaker, and mixes vocal signals supplied from the microphone with signals of reproduced musical accompaniments, amplifies the mixed signals, and supplies the amplified signals to the loudspeaker to produce audible sounds.

Sometimes, a user of the musical accompaniment playback apparatus may be desirous of playing back and singing the latter half of a music piece or song or a certain portion of the music piece repeatedly several times. It would be convenient if any desired portion of a music piece or song can be played back repeatedly.

Recently, compact disks (CDs), which are one type of digital audio disks, are used as a recording medium for karaoke music or musical accompaniments. On a CD, pulse-code-modulated musical information is recorded in time-divided storage areas. Code information, referred to as a "subcode", is recorded at the leading end of each of the storage areas. One of the innovative features of the CDs is that any desired music piece recorded on a CD can quickly be selected or accessed by searching the subcodes on the CD at high speed. One storage area, known as "TOC" (Table of Contents) and serving as a table of subcodes for retrieving recorded music pieces, is located on the innermost track of the CD, called "lead-in area", which is read first at the playback. The TOC storage area has a storage capacity of 9 bytes. When a CD is loaded in a CD player, the CD player reads the data of the TOC on the CD. The user inputs a control command indicative of the subcode corresponding to the leading end of a desired music piece recorded on the CD. Then, the CD player searches for an address having the indicated subcode on the CD, and moves an optical pickup to a radial position on the CD which corresponds to the address. When the optical pickup reaches the addressed position, it starts to reproduce the music information from the address.

The TOC storage area can store only information about time periods from the start of the music pieces, addresses of the time-divided storage areas or sections, etc. because of the limited storage capacity. The storage capacity of the TOC storage area is not large enough to store any data that would interconnect the words of the recorded music pieces or songs and the addresses. Accordingly, the CD player cannot start playing back the CD from the position of any desired word of the song.

SUMMARY OF THE INVENTION

It is an object of the present invention to provide an apparatus for reproducing recorded information including music pieces or songs, in such a manner that the recorded information can start so as to be reproduced from the position of any desired word of a recorded music piece or song and can stop so as to be reproduced at the position of any desired word of a recorded music piece or song.

According to one aspect of the present invention, there is provided an apparatus for reproducing information from an information storage medium which stores digital audio information including a plurality of music piece information, a digital contents information table including word-of-song information which represent the words of the music piece information and word-of-song address information for specifying the time-base position of the word-of-song information, and music address information for specifying the time-base position of the music information, the music address information corresponding to the word-of-song address information, the apparatus comprising information reading means for reading information from the information storage medium, and control means for controlling the information reading means, by specifying a word-of-song start address position in the word-of-song address information, to start reproducing the music piece information from a music start address position which corresponds to the word-of-song start address position. The apparatus may further comprise information display means for displaying the word-of-song information, command input means for inputting command to specify a word-of-song start position or a word-of-song end position, acoustoelectric transducer for transducing voice sound sung in relation to the music piece information into electric voice information, and information mixing means for mixing the music piece information with the electric voice information.

According to another aspect of the present invention, there is provided an apparatus for reproducing information from an information storage medium which stores digital audio information including a plurality of music piece information, a digital contents information table including word-of-song information which represent the words of the music piece information and word-of-song address information for specifying the time-base position of the word-of-song information, and music address information for specifying the time-base position of the music information, the music address information corresponding to the word-of-song address information, the apparatus comprising information reading means for reading information from the information storage medium, and control means for controlling the information reading means, by specifying a word-of-song end address position in the word-of-song address information, to stop reproducing the music piece information at a music end address position which corresponds to the word-of-song end address position. The apparatus may further comprise information display means for displaying the word-of-song information, command input means for inputting a command to specify a word-of-song start position or a word-of-song end position, acoustoelectric transducer means for transducing voice sound sung in relation to the music piece information into electric voice information, and information mixing means for mixing the music piece information with the electric voice information. The information storage medium may include an optical storage disk according to an Adaptive Differential Pulse Code Modulation system. The control means may comprise means for repeatedly reproducing the music piece information between the music start address position and the music end address position. The command input means may include a bar-code reader.

The control means comprises means for repeatedly reproducing the music piece information between the music start address position and the music end address position.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a diagram showing a table of ADPCM sound quality levels and audio characteristics.

FIGS. 7(A) through 7(D) are flowcharts of control programs for controlling operation of the musical accompaniment playback apparatus shown in FIG. 6.

DETAILED DESCRIPTION OF THE PREFERRED EMBODIMENT

First Embodiment

Figure 1A:
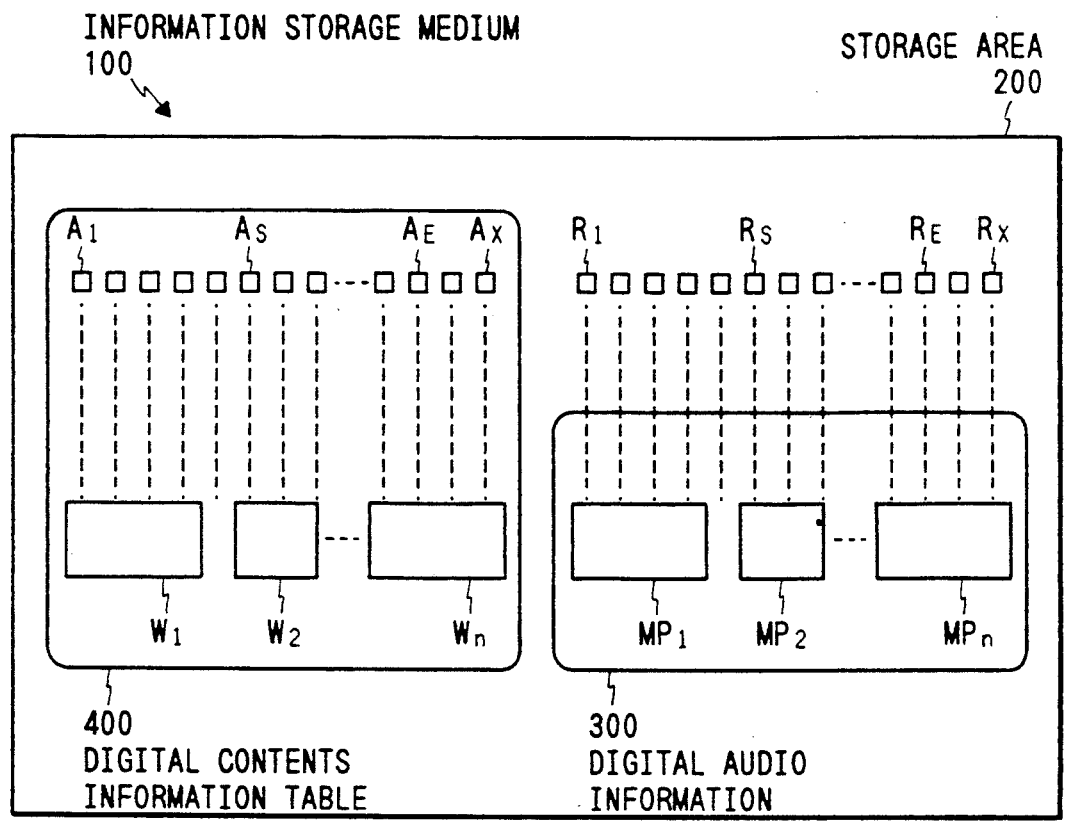
FIGS. 1(A) and 1(B) are diagrams illustrating a first embodiment of the present invention, respectively.
Figure 1B:
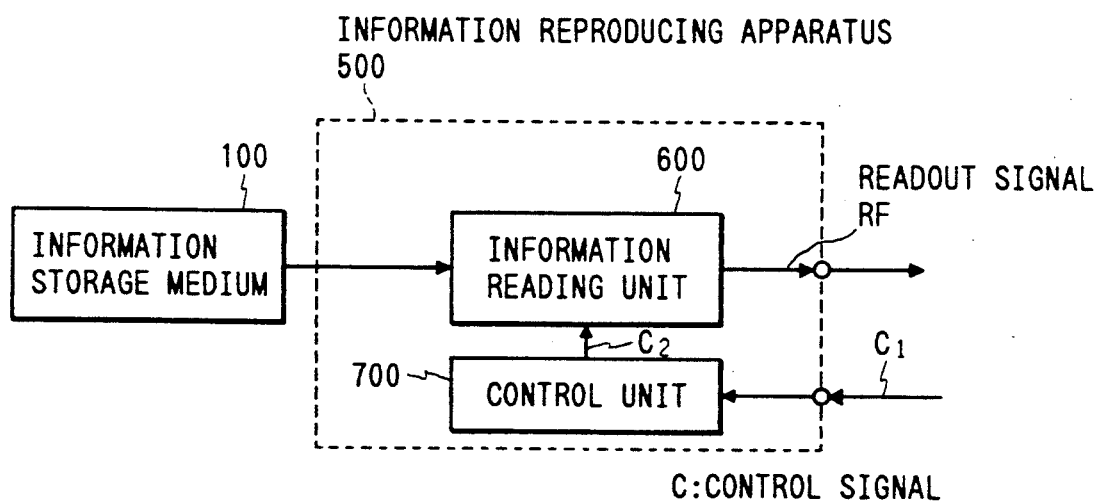

FIGS. 1(A) and 1(B) schematically show a first embodiment of the present invention.

FIG. 1(A) shows an information storage medium 100 for use in the present invention, the information storage medium 100 having a storage area 200. The storage area 200 stores digital audio information 300, a digital contents information table 400, and a plurality of music address information $R_1$-$R_x$. The digital audio information 300 contains a plurality of music piece information $MP_1$-$MP_n$. The music address information $R_1$-$R_x$ serve to specify the time-base positions of the music piece information $MP_1$-$MP_n$. The digital contents information table 400 contains a plurality of word of song information $W_1$-$W_n$. The word-of-song information $W_1$-$W_n$ represent the texts or words of the music information $MP_1$-$MP_n$. The word-of-song address information $A_1$-$A_x$ specify the time-base positions of the word-of-song information $W_1$-$W_n$. The music address information $R_1$-$R_x$ correspond to the word-of-song information $A_1$-$A_x$. Specifically, the music address information $R_1$ corresponds to the word-of-song address information $A_1$. Likewise, the music address information $R_2$-$R_n$ correspond respectively to the word-of-song address information $A_2$-$A_n$. As shown in FIG. 1(B), the information recorded in the information storage medium 100 can be reproduced by an information reproducing apparatus 500 which comprises an information reading unit 600 and a control unit 700.

The information reading unit 600 of the information reproducing apparatus 500 outputs a readout signal RF representing the word-of-song information $W_1$-$W_n$, or the word-of-song information $W_1$-$W_n$ and the word-of-song address information $A_1$-$A_x$ together, contained in the digital contents information table 400 of the information storage medium 100. The readout signal RF may be reproduced as a character image by a graphic display unit. Based on the word-of-song information $W_1$-$W_n$ or the word-of-song information $W_1$-$W_n$ and the word-of-song address information $A_1$-$A_x$ which are displayed, the user selects the position $A_S$ of a desired word of a music piece or song which is to start the reproduction. The selected position $A_S$ is supplied as a control signal $C_1$ to the control unit 700. The control unit 700 searches for the music address information $R_S$ corresponding to the position $A_S$ of the desired word which is selected, and applies a control signal $C_2$ to the information reading unit 600 in order to move the information reading unit 600 to an address indicating the selected position. In response to the control signal $C_2$, the information reading unit 600 moves to the addressed position, and starts to reproduce the music piece from the position of the desired word. If the control signal $C_1$ is supplied directly as word-of-song start address information $A_S$, then the control unit 700 searches for the music start address information $R_S$ corresponding to the word-of-song start address information $A_S$, and controls the optical pickup in the same manner as described above.

To finish the reproduction mode, the user selects the position $A_E$ of a desired word of a music piece or song, where the reproduction is to be stopped, based on the word-of-song information $W_1$-$W_n$, or the word-of-song information $W_1$-$W_n$ and the word-of-song address information $A_1$-$A_x$ which are displayed. The selected position is supplied as a control signal $C_1$ to the control unit 700. The control unit 700 searches for the music address information $R_E$ corresponding to the position $A_E$ of the desired word which is selected. When the information reading unit 600 reaches the addressed position $A_E$, the control unit 700 applies a control signal $C_2$ to the information reading unit 600 in order to stop the reading operation of the information reading unit 600. In response to the control signal $C_2$, the information reading unit 600 stops reproducing the music piece at the position of the desired word. The control unit 700 is also capable of repetitively reproducing any recorded music information between the music start address information $R_S$ and the music end address information $R_E$.

Second Embodiment

Figure 2:
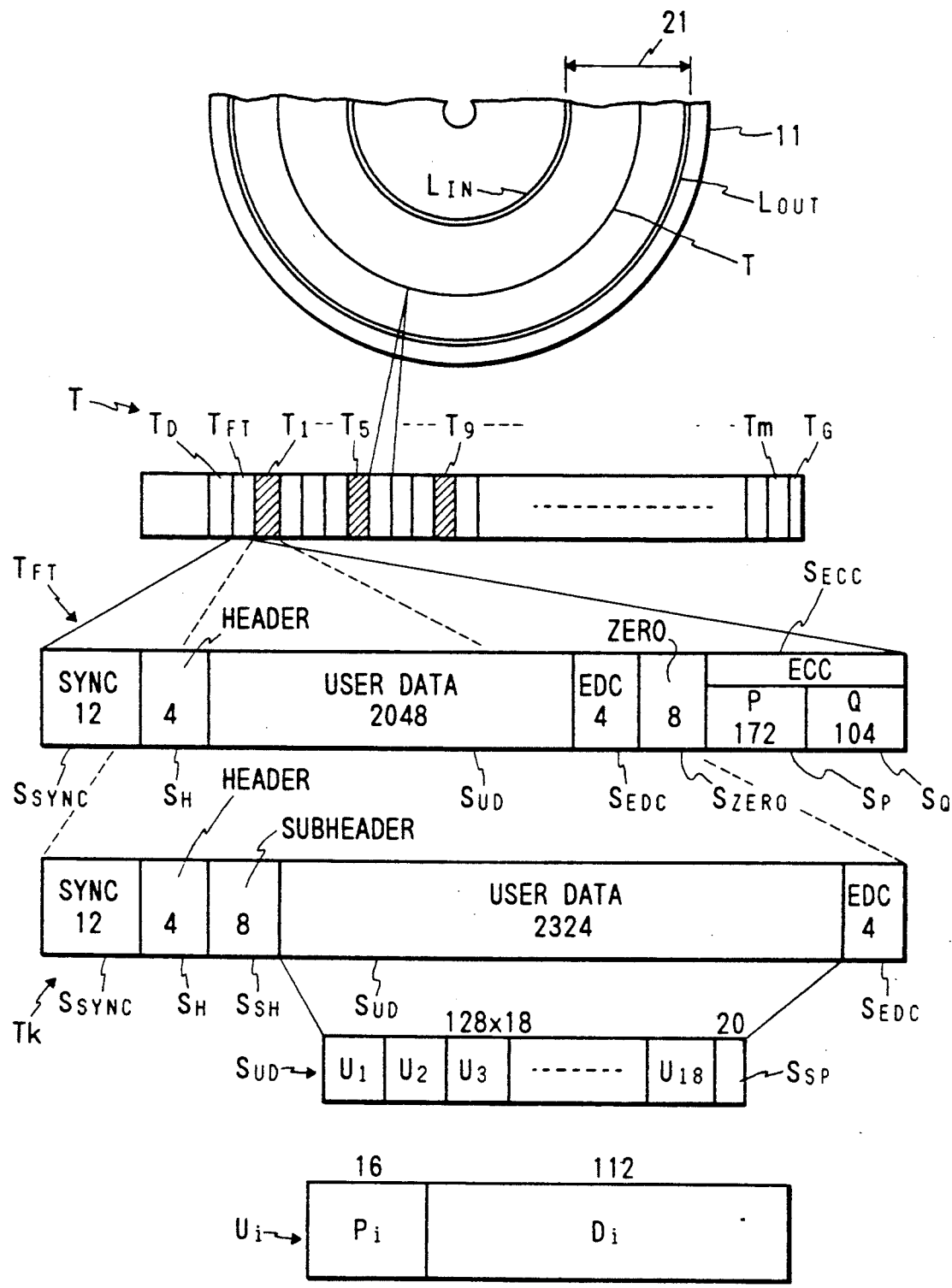
FIG. 2 is a diagram showing a data structure of a CD-ROMXA disk which is used in a second embodiment of the present invention.

FIG. 2 shows a data structure of an information storage medium used in a second embodiment of the present invention, the information storage medium being in the form of a CD-ROMXA disk.

A CD-ROM is an information storage medium that employs a compact disk (CD), which has been widely used as a digital audio disk, as a ROM (read-only memory) for only reading stored digital information. Standards for CD-ROMs were established in 1985. CD-ROMs are finding widespread use in various applications, and are advantageous in that they provide a very large storage capacity, are highly reliable as they operate optically, can access desired information quickly, are available in a large number of duplicates, and can establish an inexpensive reproduction system.

Information storage mediums which employ a format based on the CD-ROM include a CD-I (CD-Interactive) and a CD-ROMXA. Both can record and reproduce voice sound/audio information and image information, which are modulated according to ADPCM (Adaptive Differential Pulse Code Modulation) (see Nikkei Electronics, May 15, 1989, pages 195–200).

The data/sector structure of a storage area in a CD-ROMXA is illustrated in FIG. 2.

According to the CD signal format, 98 frames of subcodes are handled as one block, and one block corresponds to 1/75 second. Since $$44.1 \times 10^3 \times 16 \times 2 \times 1/75 \times \tfrac{1}{8} = 2352,$$

data represented by 2352 bytes can be recorded in one block on a CD. In the above equation, $44.1 \times 10^3$ indicates a sampling frequency, 16 a quantizing number, 2 left and right channels (L and R) of a stereophonic system, 1/75 time (second), and $\tfrac{1}{8}$ a conversion rate between bits and bytes.

On the CD-ROMXA disk, each block is referred to as a sector, user data are recorded in each sector. There are two standards, Mode 1 and Mode 2 for CD-ROMXA disks depending on the size of the user data area, etc., and there are two standards, Form 1 and Form 2 for Mode 2.

As shown in FIG. 2, the CD-ROMXA disk, designated by 11, has lead-in tracks $L_{IN}$, a storage area 21, and lead-out tracks $L_{OUT}$. In the storage area 21, each track T has a volume descriptor $T_D$, sectors $T_1$-$T_m$, and a gap $T_G$. The volume descriptor $T_D$ is an area for storing an identification code indicating the CD-ROMXA disk, a flag, a startup directory, etc., and is recorded in Mode 1 or Mode 2 Form 1. The sectors $T_1$-$T_m$ (e.g., $T_k$) store image and voice sound or audio signals, and are recorded in Mode 2 Form 2, and each contain a synchronizing signal $S_{SYNC}$, a header $S_H$, a subheader $S_{SH}$, user data $S_{UD}$, and an error detecting code $S_{EDC}$. The synchronizing signal $S_{SYNC}$ is composed of 12 bytes, and serves to distinguish sectors. The header $S_H$ is composed of 4 bytes, three for storing address information similar to the subcodes for CDs, and one for storing mode information. The subheader $S_{SH}$ is composed of 8 bytes, and includes a final number $H_1$, a channel number $H_2$, a submode $H_3$, and a coding formation $H_4$. Each of these items $H_1$-$H_4$ is composed of 1 byte, and is written twice (i.e., repeated twice).

The user data $S_{UD}$ is composed of 2324 bytes and has data units $U_1$-$U_n$ and a spare unit $U_{SP}$. In FIG. 2, each of the data units $U_1$-$U_n$ is composed of 128 bytes, and the spare unit $U_{SP}$ is composed of 20 bytes. Therefore, the number of data units "n" is 18 in the illustrated embodiment. The data units $U_1$-$U_n$ are composed of a total of 2304 bytes. The voice sound and audio signals are encoded by ADPCM and recorded in these data units. The error detecting code $S_{EDC}$ is composed of 4 bytes.

Figure 3:
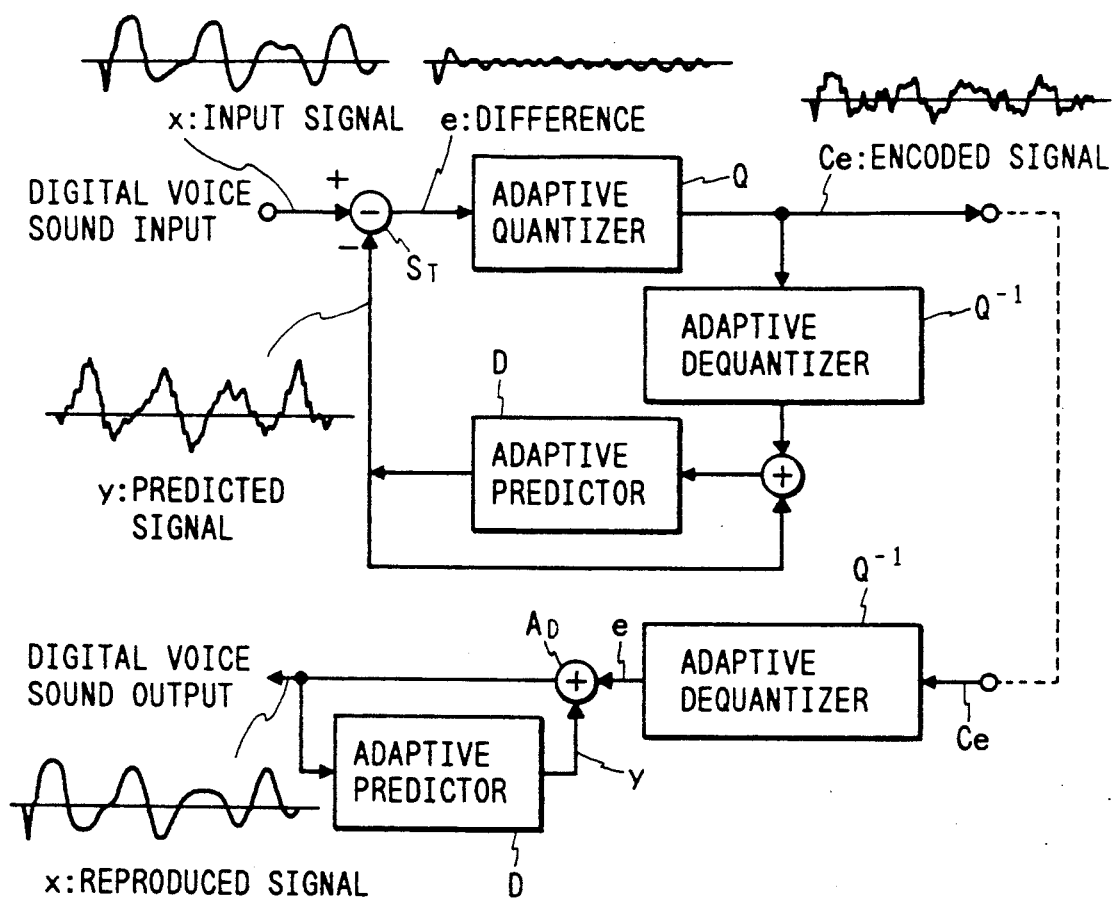
FIG. 3 is a block diagram illustrative of an ADPCM system.

FIG. 3 shows the principles of an ADPCM system. A modulation is carried out as follows. A present input signal is predicted from a past input signal by an adaptive predictor D, and the difference $e \,(=x-y)$ between the predicted signal y and a present input signal x is calculated by a subtractor $S_T$. Then, the difference e is quantized with a plurality of bits and encoded into a coded signal $C_e$ by an adaptive quantizer Q. A demodulation process is carried out in a manner which is the reversal of the above mentioned process. More specifically, the coded signal $C_e$ is decoded back to the difference e by an adaptive dequantizer $Q^{-1}$. Then, the predicted signal y from the adaptive predictor D and the difference e are added into an output signal x by an adder $A_D$.

The ADPCM system allows audio data to be recorded efficiently with a smaller number of bits. Audio characteristics vary depending on the bit reduction ratio (data compression ratio). FIG. 4 shows the relationship between ADPCM sound quality levels and audio characteristics. It can be seen from FIG. 4 that the bit reduction ratio in the sound quality level A is $\tfrac{1}{2}$ for stereophonic reproduction and $\tfrac{1}{4}$ for monaural reproduction, the bit reduction ratio in the sound quality level B is $\tfrac{1}{4}$ for stereophonic reproduction and $\tfrac{1}{8}$ for monaural reproduction, and the bit reduction ratio in the sound quality level C is $\tfrac{1}{8}$ for stereophonic reproduction and 1/16 for monaural reproduction. If the bit reduction ratio is $\tfrac{1}{4}$, then the required storage capacity may be $\tfrac{1}{4}$ of the conventional storage capacity, and the remaining $\tfrac{3}{4}$ storage capacity may be used to store other data.

In FIG. 2, each data unit $U_i$ is composed of 128 bytes, and has a sound parameter area $P_i$ and an ADPCM sample data area $D_i$. The sound parameter area $P_i$ has a storage capacity of 16 bytes, and stores a coefficient of a predictive filter in the adaptive predictor D shown in FIG. 3. The ADPCM sample data area $D_i$ has a storage capacity of 112 bytes, and stores data sampled by the ADPCM system. Therefore, one sector has an overall data storage capacity of 2016 bytes ($=112 \times 18$). If data are to be stored in the ADPCM sound quality level B for stereophonic reproduction, then 504 bytes will be required to store the data because $$37.8 \times 10^3 \times 4 \times 2 \times 1/75 \times \tfrac{1}{8} = 504.$$

Therefore, since $2016 \div 504 = 4$, data which are four times greater than the data possible with the conventional storage system can be stored. Stated otherwise, voice sound and audio signals for four channels can be stored. The first channel is stored in the sectors $T_1$, $T_5$, $T_9$, ..., $T_{4h+1}$ (h is an integer of 0 or more). The second channel is stored in sectors $T_2$, $T_6$, $T_{10}$, ..., $T_{4h+2}$. The third channel is stored in sectors $T_3$, $T_7$, $T_{11}$, ..., $T_{4h+3}$. The fourth channel is stored in sectors $T_4$, $T_8$, $T_{12}$, ..., $T_{4h+4}$.

In this manner, musical accompaniments of karaoke music pieces, which correspond to the music piece information, are pulse-code-modulated and stored in the ADPCM sample data area $D_i$. The synchronizing signal $S_{SYNC}$, the header $S_H$, the subheader $S_{SH}$, etc. correspond to the music address information.

A file information table (hereinafter referred to as a "FILE-TOC"), which is the digital contents information table, can be stored in the user data area $S_{UD}$. The FILE-TOC is stored in a sector $T_{FT}$ which, as shown in FIG. 2, comprises one or more sectors following the volume descriptor $T_D$. The FILE-TOC may be stored in Mode 1 or Mode 2 Form 1, but is stored in Mode 1 in the illustrated embodiment. More specifically, if one sector is used, then the available storage capacity for storing the FILE-TOC is 2048 bytes as shown in FIG. 2. If N sectors are used, then the available storage capacity is $2048 \times N$ bytes. In Mode 1, the sector $T_{FT}$ has no subheader, and instead has a ZERO ares $S_{ZERO}$ and an error correcting code area $S_{ECC}$. The ZERO area $S_{ZERO}$ is composed of 8 bytes and reserved. The error correcting code area $S_{ECC}$ is composed of 276 bytes, and has a parity P area $S_P$(172 bytes) and a parity Q area $S_Q$ (104 bytes).

Figure 5A:
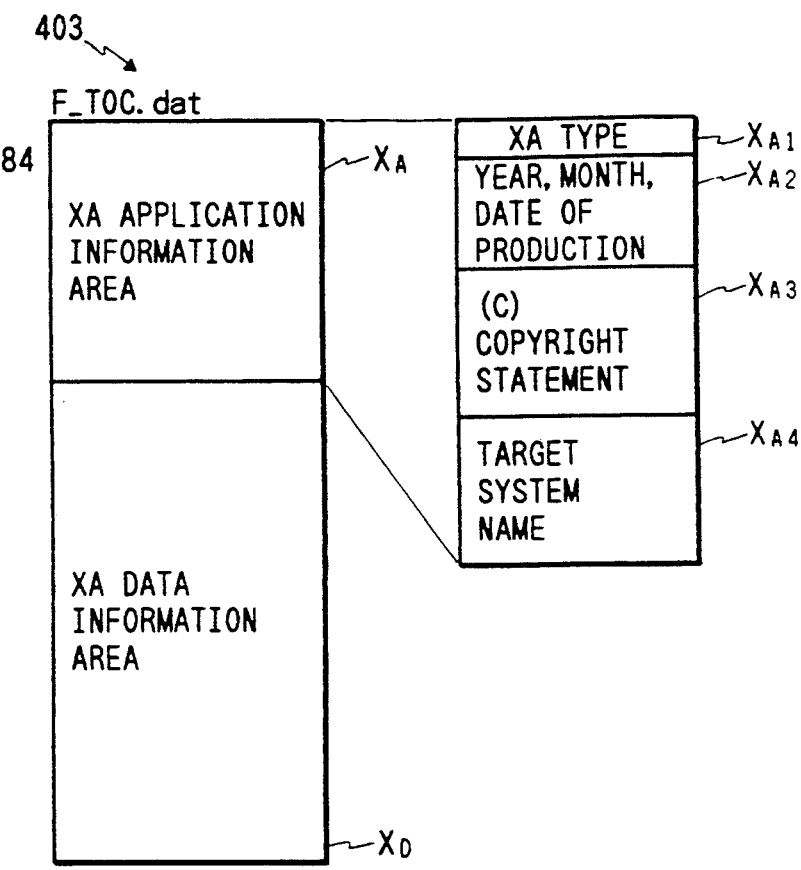
FIGS. 5(A), 5(B) and 5(C) are diagrams showing a data structure of a file information table (FILE-TOC), respectively.
Figure 5B:
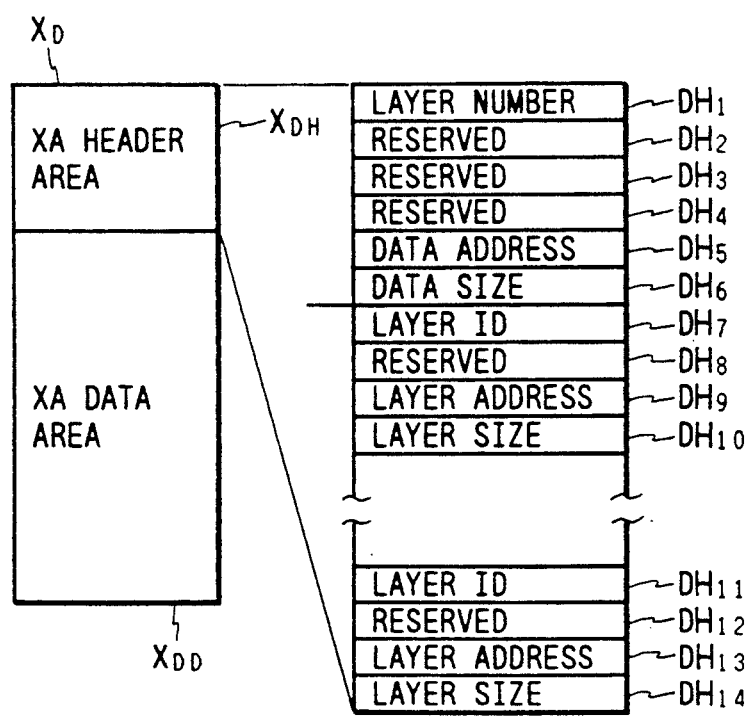
Figure 5C:
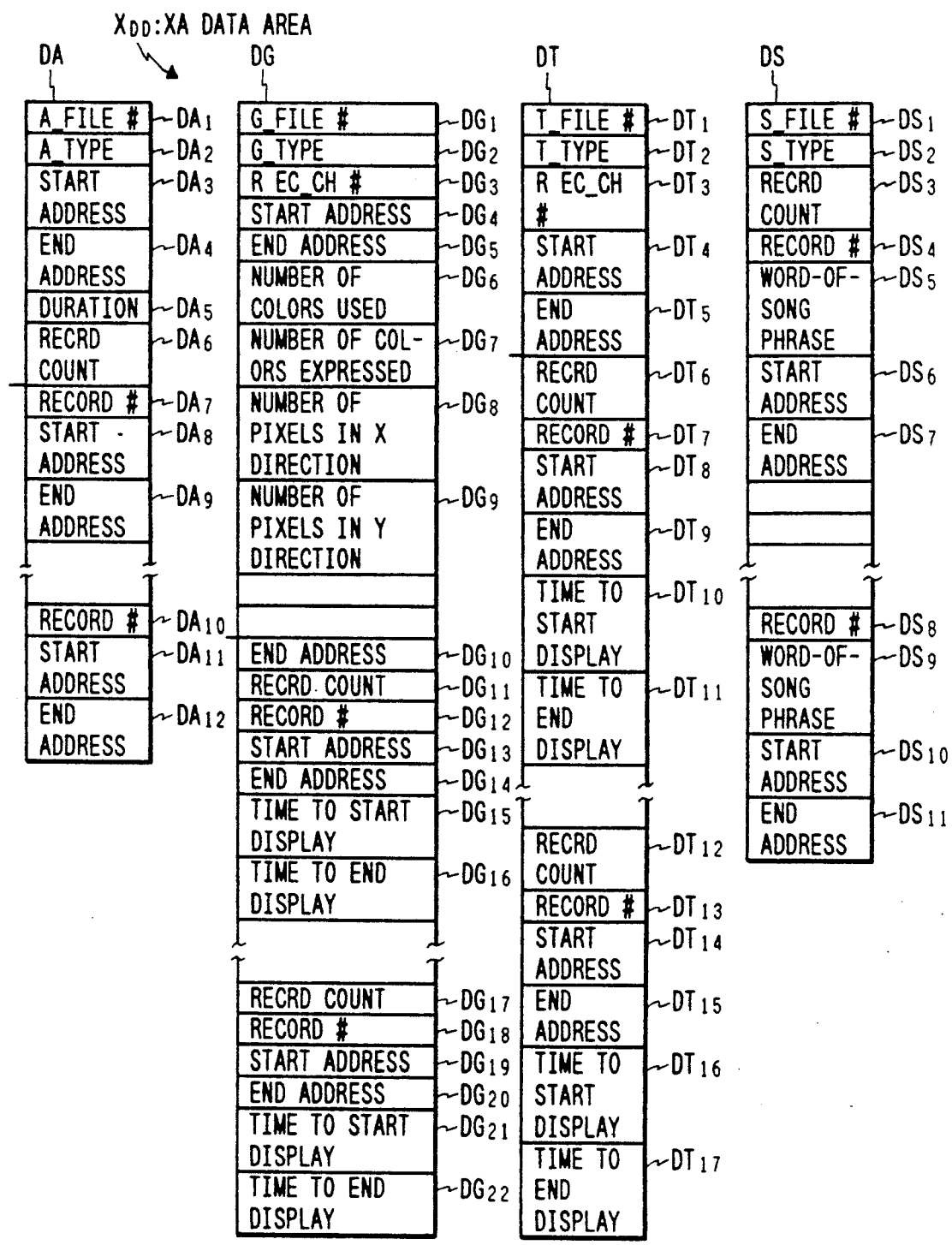

FIGS. 5(A), 5(B) and 5(C) show an example of a FILE-TOC, generally designated by 403. The FILE-TOC 403 is stored in one sector, and has an XA application information area $X_A$ and an XA data information area $X_D$. The XA application information area $X_A$ is composed of 84 bytes and serves to store information regarding the contents of the disk. The XA application information area $X_A$ includes a part $X_{A1}$, a part $X_{A2}$, a part $X_{A3}$, and a part $X_{A4}$. The part $X_{A1}$ is composed of 4 bytes, and stores the type of the CD-ROMXA disk, e.g., a type for storing only musical accompaniments of karaoke, a type for storing musical accompaniments and image information, etc. The part $X_{A2}$ is composed of 16 bytes, and stores the year, month, and data when the CD-ROMXA disk is produced. The part $X_{A3}$ is composed of 32 bytes, and stores information concerning the copyright of the CD-ROMXA disk. The part $X_{A4}$ is composed of 32 bytes, and stores information about the corresponding target system. The XA data information area $X_D$ is composed of 2240 bytes and has an XA header area $X_{DH}$ and an XA data area $X_{DD}$. The XA header area $X_{DH}$ serves to store information about the XA data area, specifically, a layer number $DH_1$, a data address $DH_5$, a data size $DH_6$, a layer ID $DH_7$, a layer address $DH_9$, a layer size $DH_{10}$, and other information. The XA data area $X_{DD}$ serves to store various information data, i.e., the digital contents information. More specifically, the XA data area $X_{DD}$ has an audio data area DA, a graphic data area DG, a telop (superimposed character) data area DT, and a word data area DS. If musical accompaniments are stored as music piece information, then the digital contents information is stored mainly in the audio data area DA. Word-of-song information and word-of-song address information are stored in the word data area DS. If word-of-song information and word-of-song address information are character code information such as JIS code information, then they are usually stored in units of 8 bits (1 byte).

Third Embodiment

Figure 6:
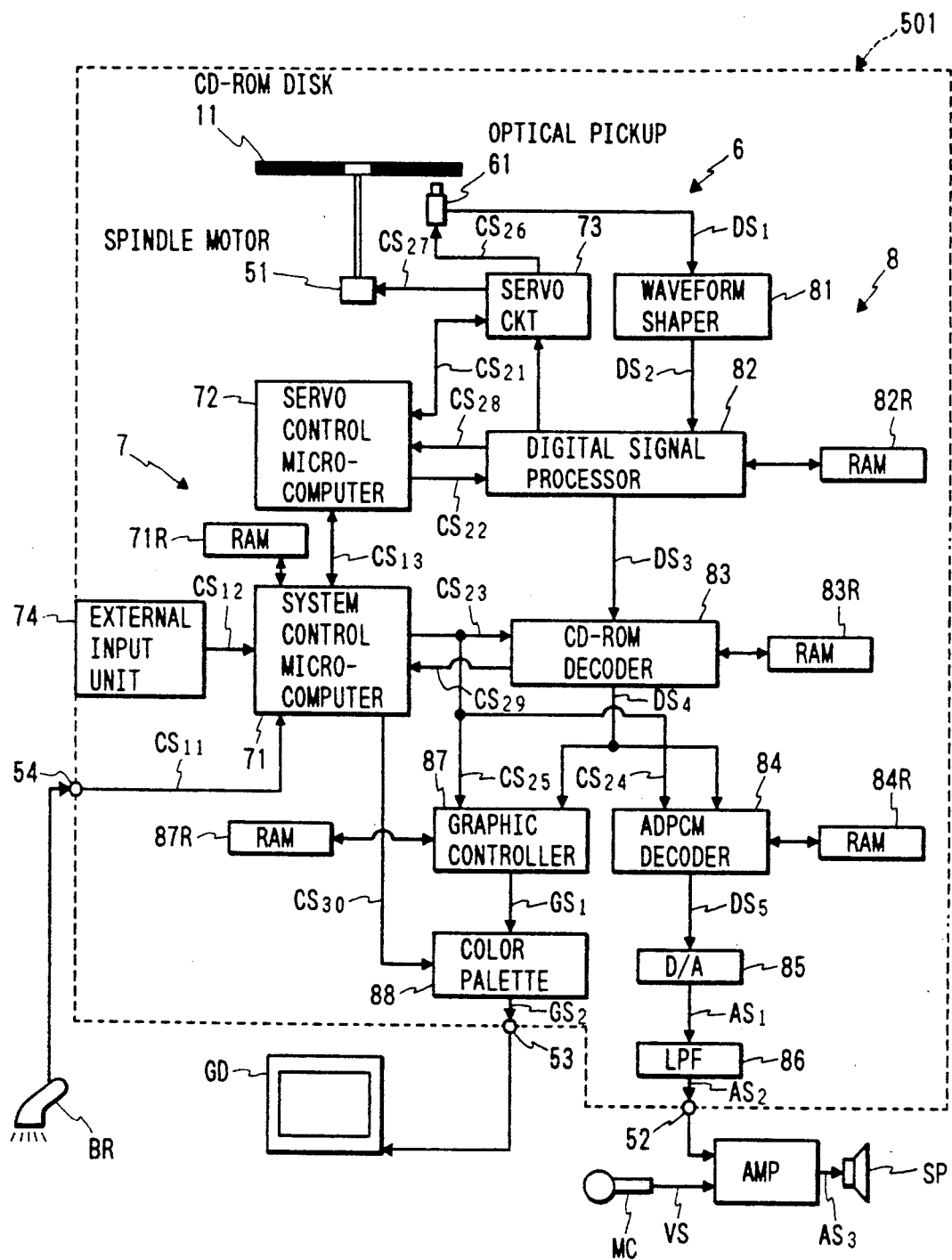
FIG. 6 is a block diagram of a karaoke or musical accompaniment playback apparatus as an apparatus for reproducing information according to a second embodiment of the present invention.

FIG. 6 shows in block form an apparatus for reproducing information as a third embodiment of the present invention. The information reproducing apparatus shown in FIG. 6 is incorporated in a karaoke or musical accompaniment playback apparatus 501.

As shown in FIG. 6, the musical accompaniment playback apparatus 501 comprises an optical pickup 61 as a means for reading information, a control block 7 as a control means, a spindle motor 51, a demodulator block 8, and external terminals 52, 53, 54.

The control block 7 comprises a system control microcomputer 71, a RAM (Random Access Memory) 71R, a servo control microcomputer 72, a servo circuit 73, and an external input unit 74.

The demodulator block 8 has a waveform shaper 81, a digital signal processor 82, a RAM 82R, a CD-ROM decoder 83, a RAM 83R, an ADPCM decoder 84, a RAM 84R, a D/A converter 85, a low-pass filter 86, a graphic controller 87, a RAM 87R, and a color palette 88.

An external amplifier AMP may be connected to the external terminal 52, and an external microphone MC and an external loudspeaker SP may be connected to the external amplifier AMP.

A graphic display unit GD may be connected to the external amplifier 53. An external control unit such as a microcomputer may be coupled to the external terminal 54.

The musical accompaniment playback apparatus 501 operates as follows:

A CD-ROM disk 11 is rotated about its own axis by the spindle motor 51. The optical pickup 61 reads a digital signal represented by a sequence of pits from the recording surface of the CD-ROM disk 11. The digital signal, designated by $DS_1$, read by the optical pickup 61 is supplied to the waveform shaper 81 by which the waveform of the digital signal is shaped. The shaped digital signal is then applied as a digital signal $DS_2$ to the digital signal processor 82. In the digital signal processor 82, the edges of an EFM signal are detected, using a reference clock signal generated by a quartz crystal oscillator, thereby reproducing a sequence of data. From the reproduced sequence of data, there is detected a frame synchronizing signal, based on which the structure of frame data is exactly reproduced. The frame data are converted into 8-bit symbol data by EFM demodulation, and written into the RAM 82R. The data stored in the RAM 82R are then deinterleaved. Thereafter, an error correcting process is effected on the data. The corrected data are then sent as a signal $DS_3$ from the digital signal processor 82 to the CD-ROM decoder 83. In the CD-ROM decoder 83, addresses are sought according to the absolute time of the subcode, synchronizing signals in the data are detected, and the data are unscrambled. Then, the header address is checked, and a desired sector is accessed. The user data which are obtained are subjected to error detection and correction processes, after which the corrected data are supplied as a signal $DS_4$ to the ADPCM decoder 84.

The ADPCM decoder 84 has an adaptive dequantizer and an adaptive predictor (not shown), and demodulates the signal $DS_4$ into a digital signal and supplies the demodulated signal as a signal $DS_5$ to the D/A converter 85.

The D/A converter 85 converts the demodulated signal $DS_5$ into an analog signal, and sends the analog signal as a signal $AS_1$ to the low-pass filter 86. The low-pass filter 86 processes the signal $AS_1$ into an accurate signal $AS_2$ and applies the signal $AS_2$ to the external terminal 52.

The analog signal $AS_2$, which is an audio output signal from the musical accompaniment playback apparatus 501, is applied to the external amplifier AMP. Voice sounds applied to the external microphone MC are converted thereby into a microphone voice signal VS. The external amplifier AMP adjusts the frequency characteristics of the analog signal $AS_2$ and also mixes the analog signal $AS_2$ with the microphone voice signal VS. Then, the external amplifier AMP amplifies the mixed signal to a suitable level, and then sends the amplified signal as a signal $AS_3$ to the external loudspeaker SP. The external loudspeaker SP converts the signal $AS_3$ into audible sounds which are radiated from the external loudspeaker SP.

The signal $DS_4$, outputted from the CD-ROM decoder 83, is also transmitted to the graphic controller 87. In cases where image information is stored in the user data $S_{UD}$ of the CD-ROM disk 11, the graphic controller 87 extracts an image signal representing the image information contained in the signal $DS_4$, and outputs the extracted image signal as a graphic signal $GS_1$. For example, the graphic controller 87 produces such a graphic signal if character code information representing word-of-song phrases and code numbers corresponding to the word-of-song phrases, respectively, is stored in the FILE-TOC 403 of the CD-ROM disk 11. The graphic signal $GS_1$ is then supplied to the color palette 88. The color palette 88 adjusts or adds the color represented by the graphic signal $GS_1$, and outputs it as a graphic signal $GS_2$ to the external terminal 53. The graphic signal $GS_2$, which is an image output signal from the musical accompaniment playback apparatus 501, is applied to the graphic display unit GD. The graphic display unit GD displays an image represented by the graphic signal $GS_2$.

The system control microcomputer 71 applies a control signal $CS_{13}$ to the servo control microcomputer 72 according to control signal $CS_{12}$ supplied from the external input unit 74, a control signal $CS_{11}$ supplied from the external terminal 54, or a control program stored in the system control microcomputer 71. The system control microcomputer 71 also controls the CD-ROM decoder 83, the ADPCM decoder 84, the graphic controller 87, and the color palette 88 with respective control signals $CS_{23}$, $CS_{24}$, $CS_{25}$, $CS_{30}$. The system control microcomputer 71 receives FILE-TOC data as a control signal $CS_{29}$ from the CD-ROM decoder 83, and stores the data in the RAM 71R. The servo control microcomputer 72 receives the control signal $CS_{13}$ from the system control microcomputer 71, and also receives a subcode signal $CS_{28}$ from the digital signal processor 82. The servo control microcomputer 72 controls the digital signal processor 82 and the servo circuit 73 with respective control signals $CS_{22}$, $CS_{21}$. The servo circuit 73 is responsive to the control signal $CS_{21}$ from the servo control microcomputer 72 to control the optical pickup 61 and the spindle motor 51 with respective control signals $CS_{26}$, $CS_{27}$.

Operation of the musical accompaniment playback apparatus 501 which is loaded with the CD-ROM disk 11 will now be described below with reference to FIGS. 7(A) through 7(D).

Figure 7A:
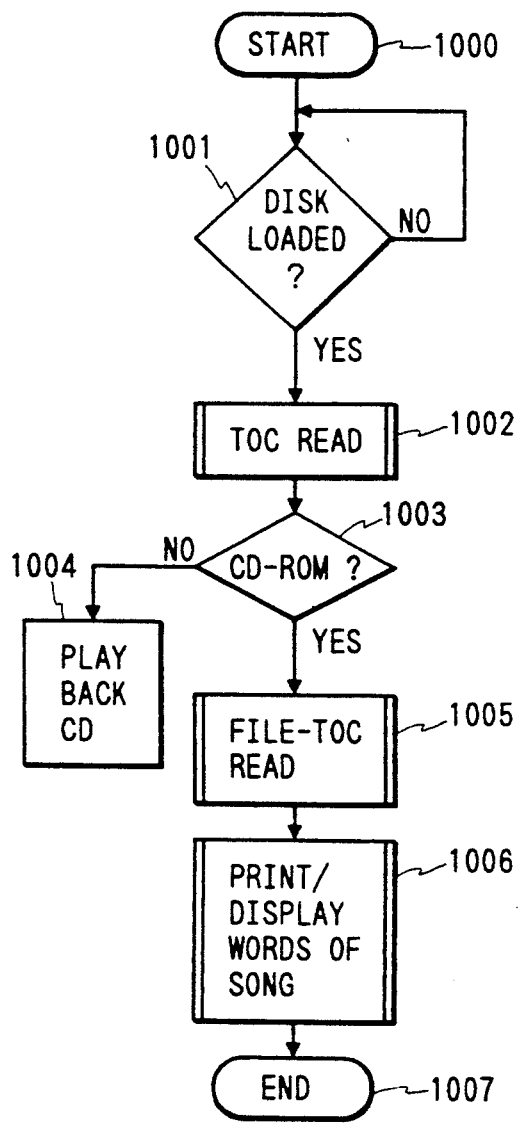

As shown in FIG. 7(A), the musical accompaniment playback apparatus 501 starts to operate at a step 1000, and then determines whether a disk is loaded or not in a step 1001. If a disk is loaded, then control goes from the step 1001 to a step 1002 which is a subroutine for reading a TOC stored in the lead-in tracks of the loaded disk. After the step 1002, the step 1003 determines whether the loaded disk is an ordinary CD or a CD-ROM. If the loaded disk is a CD-ROM, then control proceeds to a step 1005 which is a subroutine for reading the FILE-TOC data from the FILE-TOC of the disk. After the step 1005, control goes to a step 1006 which is subroutine for repeatedly reproducing desired words or text of a song on the disk in a refrain/repeat reproduction mode. The sequence shown in FIG. 7(A) ends at a step 1007.

Figure 7B:
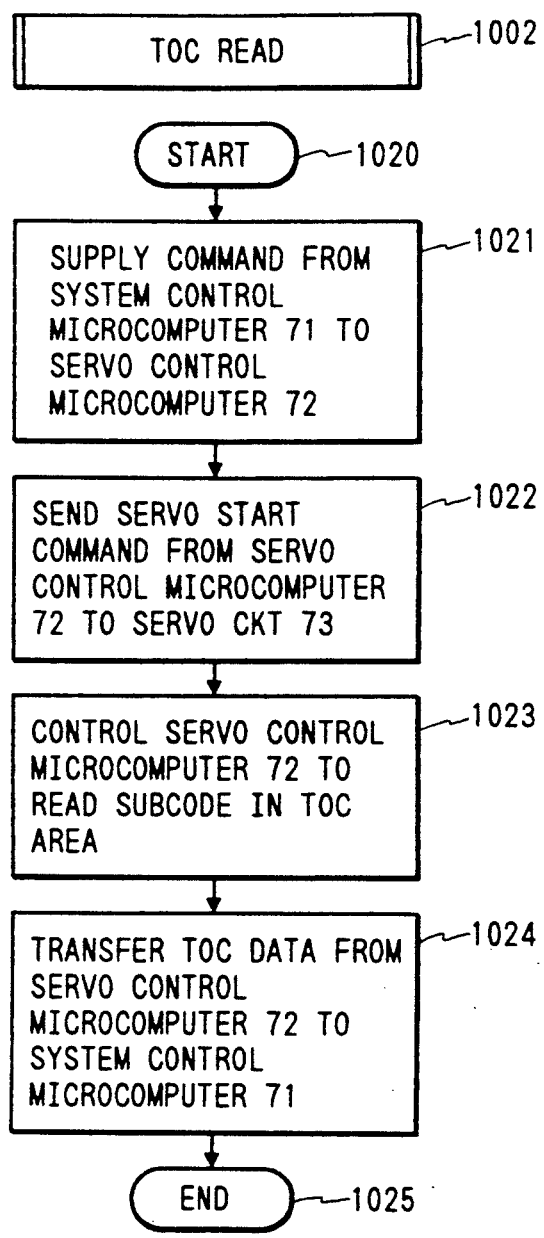

The subroutine in the step 1002 for reading the TOC is started in a step 1020 in FIG. 7(B). In a step 1021, a command signal is applied to the servo control microcomputer 72 from the system control microcomputer 71 to supply a servo operation start command from the servo control microcomputer 72 to the servo circuit 73 in a step 1022, thus controlling the optical pickup 61 for tracking under servo control. Then, the servo control microcomputer 72 reads subcodes in the TOC area on the lead-in tracks of the CD-ROM disk 11 in a step 1023. The TOC data are transferred from the servo control microcomputer 72 to the system control microcomputer 71 in a step 1024. The subroutine shown in FIG. 7(B) is finished in a step 1025.

The subroutine in the step 1005 for reading the FILE-TOC data is started in a step 1050 in FIG. 7(C). A search/reproduction command is applied to the servo control microcomputer 72 from the system control microcomputer 71 in a step 1051. Then, the servo control microcomputer 72 applies a search/reproduction command to the servo circuit 73 in a step 1052. The digital signal processor 82 transfers the FILE-TOC data to the CD-ROM decoder 83 in a step 1053. The CD-ROM decoder 83 decodes the FILE-TOC data, and the decoded FILE-TOC data are transferred from the CD-ROM decoder 83 to the system control microcomputer 71 in a step 1054. The transferred FILE-TOC data are stored in the RAM 71R in a step 1055. The subroutine shown in FIG. 7(C) is brought to an end in a step 1056.

The subroutine in the step 1006 will be described below with reference to FIG. 7(D). After the subroutine is started in a step 1060, the FILE-TOC data stored in the RAM 71R are read, and supplied to the graphic display unit GD through the graphic controller 87 and the color palette 88 by the system control microcomputer 71 in a step 1061. Then, a step 1062 determines whether a refrain/repeat key is depressed or not, using the word-of-song phrases or code numbers in the transferred FILE-TOC data. If the position (reproduction start address) of a word which is to be repeatedly reproduced in the refrain/repeat reproduction mode or the code number thereof, and also the position (reproduction end address) of a word which is to be repeatedly reproduced in the refrain/repeat reproduction mode or the code number thereof, and the number Q of repetitions are entered, then the system control microcomputer 71 applies a search/reproduction command to the servo control microcomputer 72 in a step 1063.

Then, the reproduction start address is confirmed, and the refrain/repeat reproduction mode is started in a step 1064. The number K of reproduction cycles in a counter (not shown) is incremented by 1 in a step 1065. A step 1066 then determines whether the reproduction end address is reached or not. The step 1066 is followed by a step 1067 which determines whether the number K of reproduction cycles has reached the given number Q of repetitions or not. If $K<Q$, then the refrain/repeat reproduction mode is repeated at the step 1063. If $K=Q$, then the sequence shown in FIG. (D) is brought to an end at a step 1068.

Figure 8A:
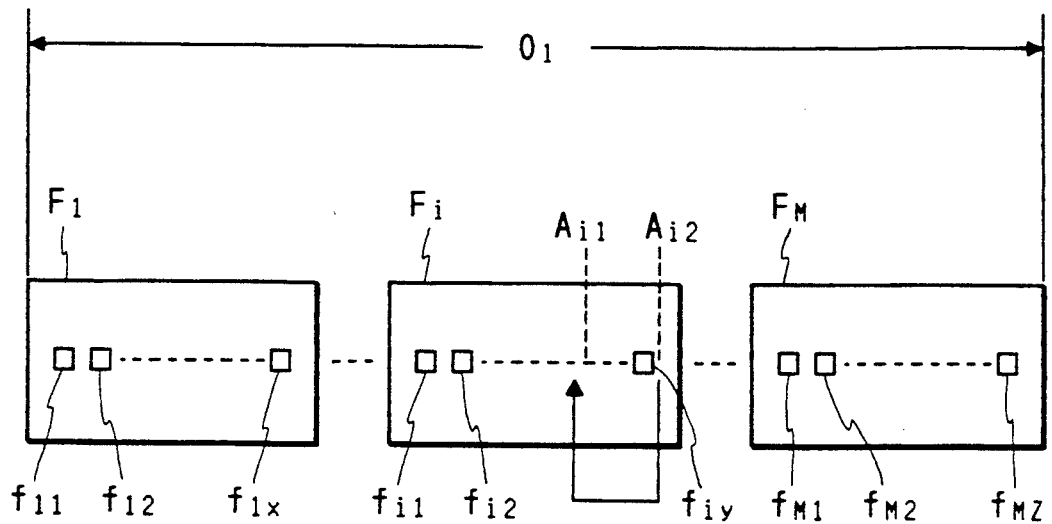
FIGS. 8(A), 8(B), 9 and 10 are views illustrative of the manner in which a repetitive playback mode is carried out in the musical accompaniment playback apparatus shown in FIG. 6, respectively.

The repetitive reproduction process will be described in detail below with reference to FIGS. 8(A), 8(B), and 9. As shown in FIG. 8(A), one musical accompaniment or karaoke music $O_1$ has a total of M word groups $F_1-F_m$. The first word group $F_1$ contains word-of-song phrases $f_{11}-f_{1x}$, the ith (that is, the number "i") word group $F_i$ contains word-of-song phrases $f_{i1}-f_{iy}$, and the Mth (number M) word group $F_M$ contains word-of-song phrases $f_{M1}-f_{Mz}$. When the word-of-song phrases between positions $A_{i1}$ and $A_{i2}$ in the ith word group $F_i$ are to be repeated, as shown in FIG. 9, the words (vertically displayed) f and the code number A indicating the positions thereof are displayed on the screen. The user may enter the code numbers $A_{i1}$, $A_{i2}$ and the number of repetitions Q through a keyboard, or a transparent touch panel switch or a light pan coupled to the graphic display unit, so that the word-of-song phrases between the positions $A_{i1}$, $A_{i2}$ can repeatedly be reproduced.

Figure 8B:
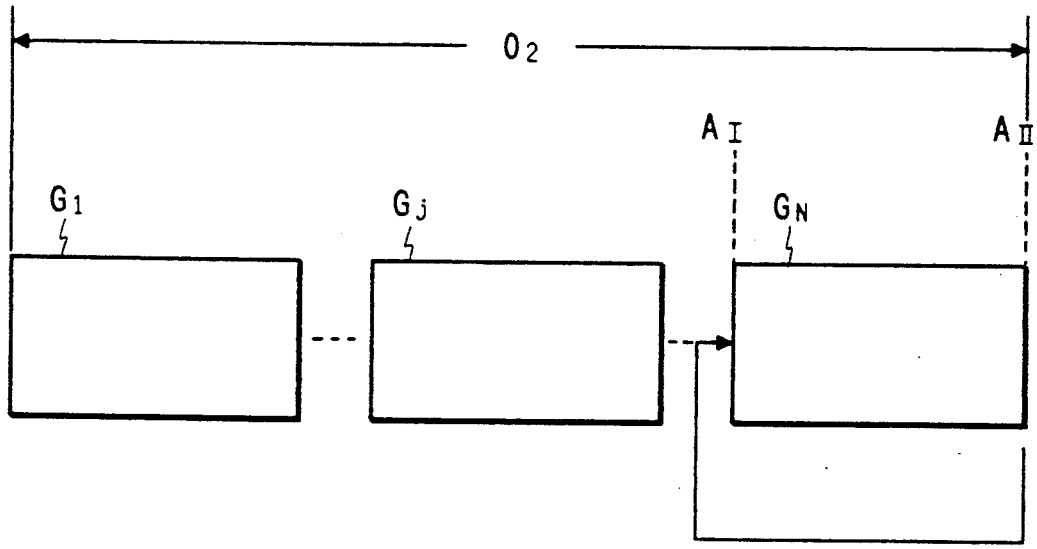
Figure 9:
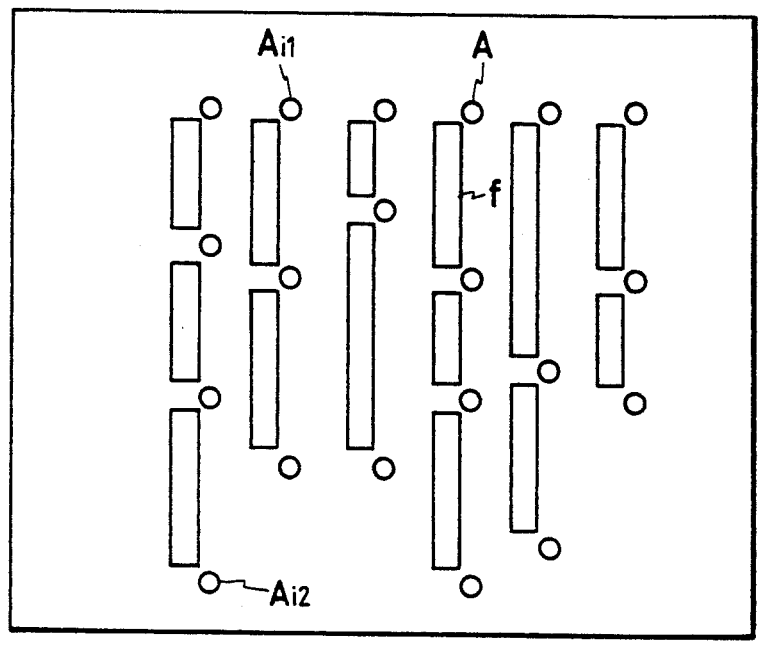

FIG. 8(B) illustrates the manner in which the Nth (number N) word group $G_N$ of a musical accompaniment $O_2$ is repeatedly reproduced between positions $A_I$ and $A_{II}$.

Figure 10:
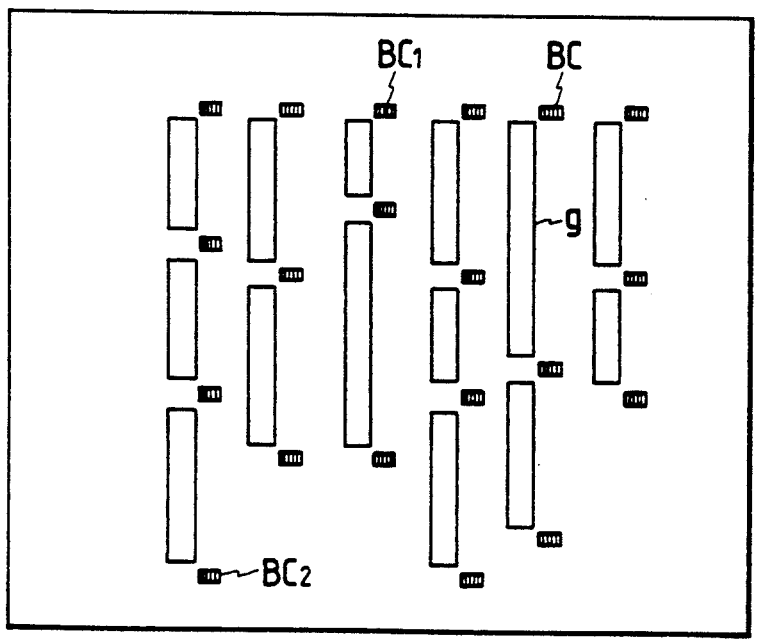

In the above embodiment, the words or text of music pieces or songs are displayed, and positions where the music pieces or songs start and stop being reproduced are entered through the key board or on the graphic display unit. However, such positions may be entered through a bar-code reader BR (FIG. 6) connected to the external terminal 54. If such a bar-code reader BR is employed, a printed song book or the like contains printed word-of-song phrases g and bar codes BC indicative of the positions thereof, as shown in FIG. 10. The user may use the bar-code reader BR to read the bar codes $BC_1$, $BC_2$, for example, for repeated reproduction of the word-of-song phrases between these positions $BC_1$ and $BC_2$.

The CD-ROMXA disk has been employed as the information storage medium in the above embodiment. However, the information storage medium may be any of various other forms including a CD-ROM, a CD-I, an ordinary CD, a DAT (digital audio tape), an IC card, and a read-only memory of another type.

With the present invention, as described above, the user of the musical accompaniment playback apparatus can control the musical accompaniment playback apparatus to either start reproducing a desired music piece or song at the position of a desired word thereof, or stop reproducing a desired music piece or song at the position of a desired word thereof, or repeatedly reproduce a desired music piece or song between desired words thereof. The musical accompaniment playback apparatus is particularly suitable for use in passenger cars.

Since the information storage medium is a digital information storage medium such as a CD-ROMXA, an ordinary CD, or the like, the data stored in the information storage medium can be accessed in a short period of time for quick reproduction of desired recorded information.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for reproducing information from an information storage medium which stores digital audio information including a plurality of music piece information, a digital contents information table including word-of-song information which represents the phrases of word-of-song of the respective music pieces information and phrase address information for specifying the time base position of the phrases, and music address information for specifying the time base position of the music piece information, the music address information corresponding to the phrase address information, said apparatus comprising:

information reading means for reading the music piece information, the word-of-song information and the phrase address information from the information storage medium;

music reproducing means for reproducing the music piece information read by said information reading means;

display means for displaying the phrases of the word-of-song information and corresponding phrase address information synchronously with the music piece information;

command input means for inputting a command to specify the phrase address information during reproduction of said music piece information by said music reproducing means; and control means for controlling said music reproducing means to reproduce the music piece information from the music address position which corresponds to said specified phrase address information.

2. An apparatus according to claim 1, further comprising:

accoustoelectric transducer means for transducing voice sound sung in relation to said music piece information into electric voice information; and information mixing means for mixing said music piece information with said electric voice information, wherein said command input means specifies first phrase address information as a start address position and second phrase address information as an end address position, and said control means controls the music reproducing means to repeatedly reproduce the music piece information between the start address position and the end address position.

3. An apparatus according to claim 2, wherein said command input means includes a bar-code reader.

4. An apparatus according to claim 1, wherein said information storage medium includes an optical storage disk according to Adaptive Differential Pulse Code Modulation system.

5. An apparatus according to claim 1, wherein said control means includes means for searching for the start address position and retrieving the music piece information beginning at the start address position.

6. An apparatus for reproducing information from an information storage medium which stores digital audio information including a plurality of music piece information, a digital contents information table including word-of-song information which represents the phrases of word-of-song of the respective music piece information and phrase address information for specifying the time base position of the phrases, and music address information for specifying the time base position of the music piece information, the music address information corresponding to the phrase address information, said apparatus comprising:

information reading means for reading the music piece information, the word-of-song information and the phrase address information from the information storage medium;

music reproducing means for reproducing the music piece information read by said information reading means;

display means for displaying phrases of the word-of-song information and corresponding phrase address information synchronously with the music piece information;

command input means for inputting a command to specify the phrase address information during the reproduction of said music piece information by said music reproducing means; and control means for controlling said music reproducing means to stop reproducing the music piece information at the music address position which corresponds to said specified phrase address information.

7. An apparatus according to claim 6, wherein said control means includes means for searching for the end address position and stopping the reproduction of the music piece information at the end address position.

* * * * *